May 12, 1931. J. L. BALTON 1,805,387
ICE CREAM SCOOP
Filed July 25, 1928 2 Sheets-Sheet 1
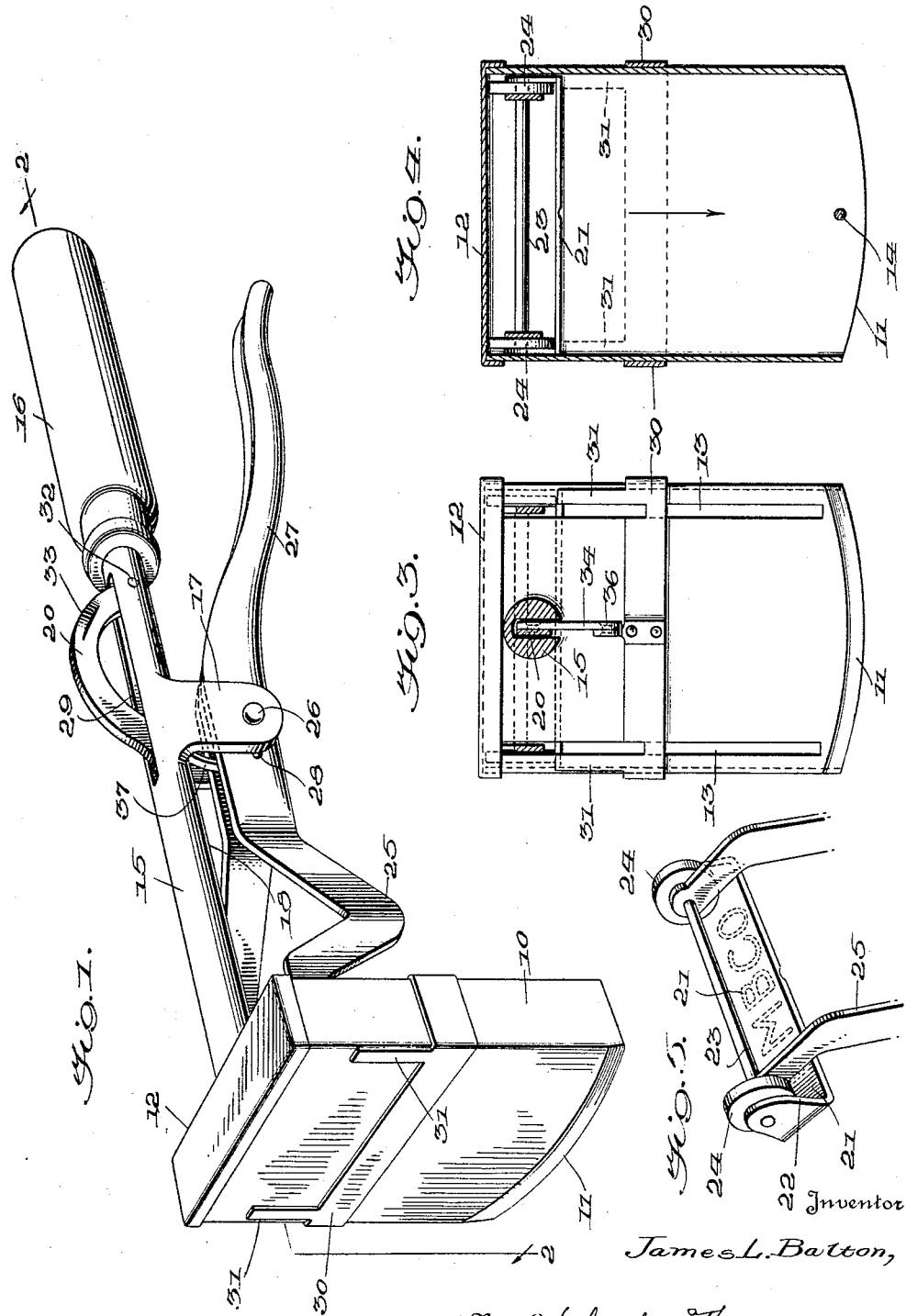
Inventor
James L. Balton,
By Hobart F. Woodward
Attorney May 12, 1931.  J. L. BALTON  1,805,387
ICE CREAM SCOOP
Filed July 25, 1928  2 Sheets-Sheet 2
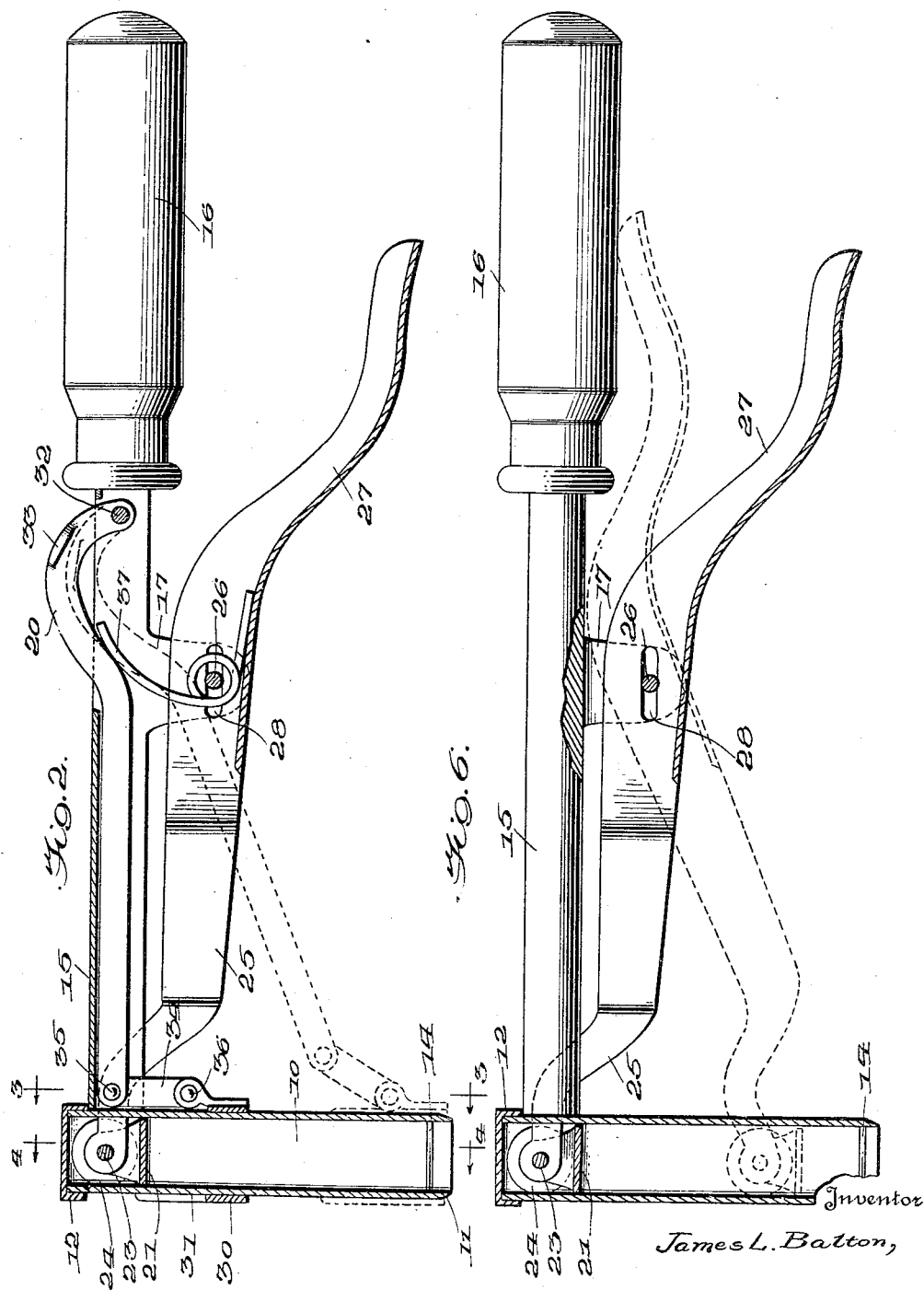

Patented May 12, 1931

1,805,387

UNITED STATES PATENT OFFICE

JAMES L. BALTON, OF BALTIMORE, MARYLAND, ASSIGNOR TO JOSEPH SHAPIRO, OF BALTIMORE, MARYLAND

ICE CREAM SCOOP

Application filed July 25, 1928. Serial No. 295,138.

This invention relates to ice cream dispensers or scoops used for filling edible containers and more particularly to that type in which a spring is provided for normally maintaining the ejector in its retracted position, and one of the objects is to provide a neat, compact and sanitary dispenser so constructed that it can be cheaply manufactured and the spring is entirely housed.

Another object is to provide a dispenser body with knife edges so that the ice cream may be readily gathered from the bulk.

A further object of my invention is to provide a dispenser so that the amount of ice cream therein may be readily ascertained.

Another and further object is to provide a dispenser having the lower end slightly rounded so that the ice cream may be easily gathered from the walls of round containers in which the ice cream is usually packed.

With the foregoing and other objects in view, the invention resides in the combination and arrangement of parts and in the details of construction hereinafter described and claimed, it being understood that, within the scope of what is claimed, changes, variations and modifications may be resorted to without departing from the scope of the appended claims.

On describing the invention in detail, reference is had to the accompanying drawings which form a part of this specification and wherein like characters of references indicate corresponding parts throughout the several views, in which—

Figure 1 is a perspective view of my improved scoop;

Figure 2 is a sectional view on line 2—2 Figure 1;

Figure 3 is a sectional view on line 3—3 Figure 2;

Figure 4 is a sectional view on line 4—4 Figure 2;

Figure 5 is a detail view of the extractor;

Figure 6 is a modified view of my scoop.

In the use of ice cream dispensers or scoops for serving slices of ice cream considerable difficulty has been had in that the scoops have been inconvenient to manipulate and in that when separating the ice cream from the bulk the scoop had to be moved back and forth, thus making a large opening in the ice cream which resulted in wastage. In addition, previous dispensers, where the handles issued directly from the same, were found to be inefficient in that they could not be used close up to the walls of the can. My invention overcomes these objections in a manner that will be presently explained.

Referring to the drawings in detail 10 designates the scoop or dispenser body having its forward end slightly tapered to facilitate its use. This scoop is opened at one end as shown at 11 while the other end thereof is closed by member 12 which is suitably attached to the scoop body 10. The open end 11 has the corners ground off so that the central portion of the open end is in a plane lower than the corners, thus the open end is slightly rounded off to facilitate the gathering of the ice cream from the wall of round containers. Elongated openings 13 are formed in the rear wall of the scoop 10 and through these openings the amount of ice cream in the scoop may be readily ascertained.

Through the front and rear walls near the open end is placed pin 14, or other cutting means which is adapted to cut the ice cream into sections when discharging it. As many pins or cutting means may be used as is necessary according to the number of divisions in the container. Pin 14 or cutting means may be omitted if it is desired to use the scoop with containers not having a division formed therein.

A shank or stem 15 is suitably attached to the rear wall of the scoop 10, and is perpendicular thereto; this stem being formed with a hand grip 16. Stem 15 is formed by stamping out a substantially rectangular piece of material having ears 17 projecting therefrom and then the material stamped out is formed by suitable means to tubular shape having opening 18 extending along the under side thereof. Opening 19 is formed in the upper side of shank 15 through which projects member 20 whose function will be later described.

To discharge the contents of the scoop body, after it has been filled from a mass of semi-solid material, I provide the ejector 21 formed as a plunger slidably mounted in the scoop body. Ejector 21 is formed with upturned ends 22, and shaft 23 is fixably mounted therein. Rollers 24 are mounted on shaft 23 and are adapted to ride against the front and rear walls on its up and down stroke. The ejector 21 is actuated by means of levers 25 which are suitably connected to shaft 23. Levers 25 pass through openings 13 and are fulcrumed intermediate its ends on shaft 26. Shaft 26 is mounted in the downwardly projecting ears 17.

Levers 25 terminate in finger grip member 27 which is rounded so as to facilitate grasping by the fingers. Elongated slots 28 are formed in the levers 25 just forward of the finger member 27 and through these openings pass shaft 26.

To clean any ice cream that adheres to the outside of the scoop body a scraper 30 is provided which consists of a thin band of material extending around the outside body of the scoop. Guide members 31 are attached to the scraper band, but the scraper may merely consist of a band of material of sufficient width to ride freely in its travel up and down the scoop body.

The scraper in addition to cleaning the ice cream from the scoop body also forces the container off the dipper thus preventing breakage of the containers and leaves the filler even with the top of the container.

Scraper 30 is actuated by member 20 suitably mounted in the shank 15 at 32 and projects through the opening 19 in the shank. A thumb piece 33 is formed integral with the member 20 and is so arranged as to present an easy means of pressing the member downward. Member 20 is normally housed in the shank 15 and at its ends near the scoop body is connected by a link member 34 to the scraper 30. Link 34 is attached to the member 20 and scraper 30 by brads 35 and 36 or by other suitable means.

Spring 37 is coiled around shaft 26 and urges the scraper and ejector in the raised position.

If so desired the scoop may be used without the scraper 30 and the modified form of my invention showing the dispenser without the scraper is shown in Figure 6.

On the face of the ejector 21 is drawn the name of the seller using the dispenser and thus the name of the seller is molded on the top of the ice cream placed in the container.

What I claim is:

1. An ice cream scoop including a scoop body; an ejector mounted in said scoop body, said ejector provided with rollers mounted on a shaft carried by said ejector; a stem perpendicular to said scoop, and means mounted on said stem for actuating said ejector.

2. In an ice cream scoop, a scoop body provided with a handle, an ejector mounted therein, slots in the walls of the scoop body adjacent the handle, an ejector member slidable within the scoop body, rollers carried by said ejector member to facilitate the free movement thereof, a scraper member downwardly movable about the outside of said scoop body, and means, including levers supporting the ejector member and extending through the slots, for actuating the ejector and scraper simultaneously.

3. In an ice cream scoop including a scoop body, an ejector mounted in said scoop body, said ejector having rollers mounted thereon; a stem connected to said scoop body; and means mounted on said stem for actuating said ejector.

4. In an ice cream scoop, a scoop body provided with a handle, an ejector shiftable within the scoop body for ejecting the contents of the scoop body, rollers carried by said ejector, a scraper downwardly movable about the outside of said scoop body and means for actuating the ejector and scraper.

JAMES L. BALTON.